Feb. 14, 1939.  W. E. HASELWOOD  2,146,820
APPARATUS FOR AND METHOD OF MEASURING SPEED
Filed July 1, 1937  2 Sheets—Sheet 1
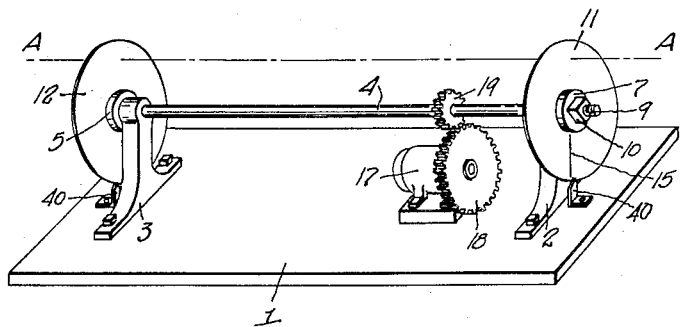
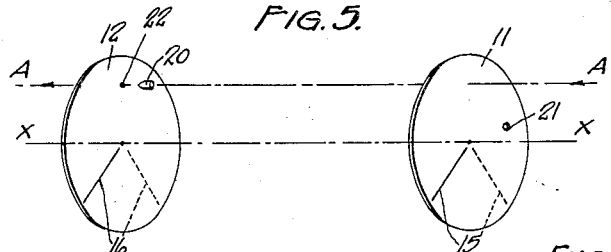
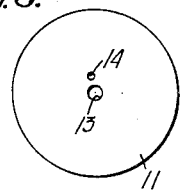
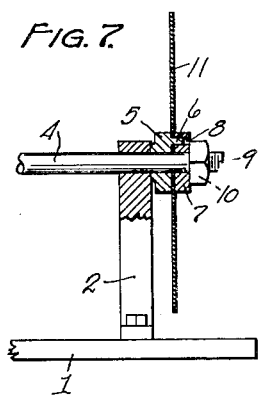
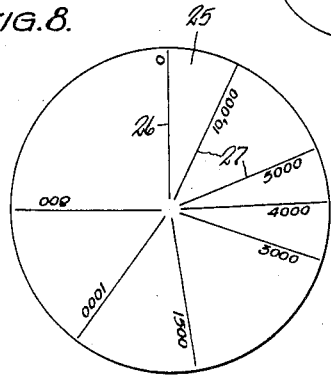
INVENTOR.
WILLIS E. HASELWOOD.
BY Oltsch & Knoblock
ATTORNEYS.

Feb. 14, 1939.     W. E. HASELWOOD     2,146,820
APPARATUS FOR AND METHOD OF MEASURING SPEED
Filed July 1, 1937     2 Sheets-Sheet 2
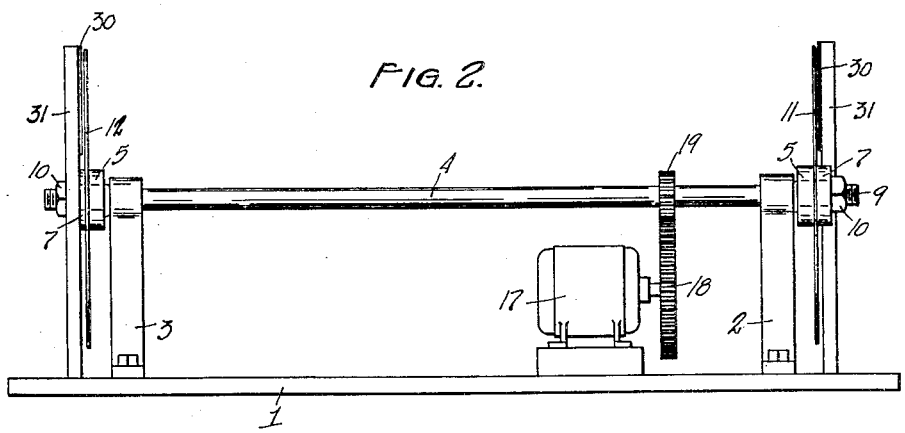
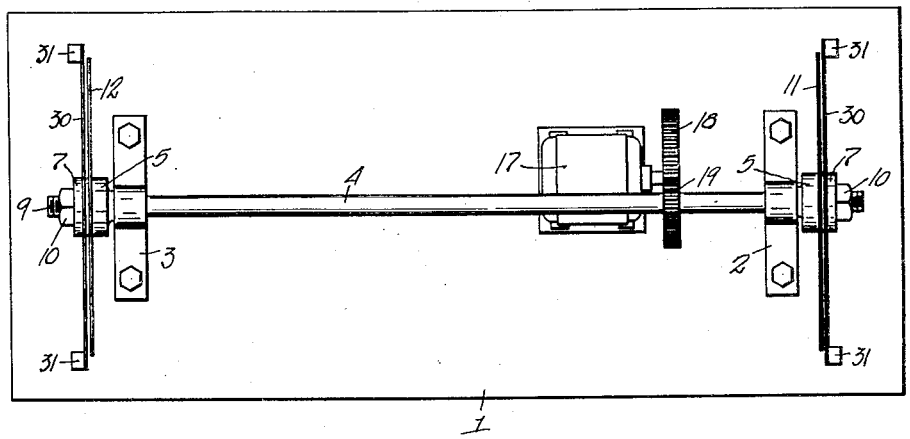
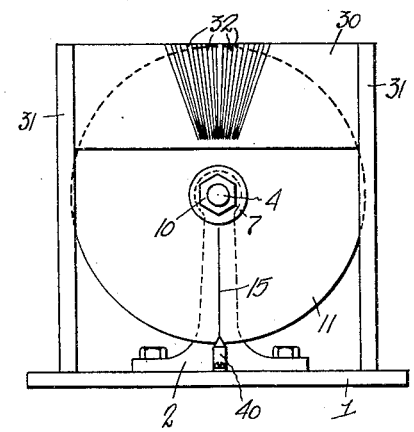
INVENTOR.
WILLIS E. HASELWOOD.
BY Oltsch & Knoblock
ATTORNEYS.

Patented Feb. 14, 1939

2,146,820

UNITED STATES PATENT OFFICE 2,146,820

APPARATUS FOR, AND METHOD OF, MEASURING SPEED

Willis E. Haselwood, Elkhart, Ind.

Application July 1, 1937, Serial No. 151,355

5 Claims. (Cl. 234—1)

My invention relates to apparatus for, and method of, measuring speed, and more particularly to such devices suitable for use in measuring the speed of small objects travelling at extremely high velocities.

Many devices have been contrived for determining the speed of objects, but most of these involve highly intricate electrical circuits which have components that are subject to considerable variation with age. Also these devices cannot usually be operated by small objects travelling at extremely high speeds, such as a lead bullet weighing 46 grains and travelling at a velocity in excess of 4000 feet per second. This is particularly true of the type of apparatus that requires the moving object to intercept a beam of light that is directed on a photoelectric cell. The type that requires the moving object to complete or disrupt two electrical circuits has the disadvantage of requiring the moving object to be carefully directed, and requires mechanical recording means which introduces inaccuracies. Such prior devices have necessarily been very expensive, and hence can be procured only by those of considerable means.

The principal object of my invention is to provide a speed measuring device that is especially suited to use with small objects travelling at very high speeds and which is extremely accurate and simple to operate.

Another object is to provide such a device that is readily portable and that is inexpensive.

Another object is to provide a novel method for determining the velocity of an object.

A further object is to provide a device of this character with means of indicating factors, such as deflection, for which compensation must be made to obtain accurate results.

A further object is to provide a device of this character having spaced members shiftable in unison, with means for insuring accurate registration of said members.

A further object is to provide a device of this character having a pair of measuring members with which a protractor or calculator may be readily employed to rapidly and simply indicate the result desired.

The device of my invention consists essentially of two rapidly rotating discs of relatively soft paper adapted to be pierced by the object whose speed is to be determined. These two discs are fixed a known distance apart on a common shaft so that they rotate in absolute synchronism. Suitable index points are provided on each of these discs so that the angular relationship of the discs can be restored after they have been pierced by the moving object and removed from the shaft. The speed is very easily determined by measuring the angle that the second disc rotates after the first disc has been pierced, and the spacing between the discs is a known factor and the angular speed of the discs is also a known factor. The angular movement of the discs between the piercing of the first and the piercing of the second is determined by placing the two discs in contact with each other on a spindle and bringing the pierced holes into register. The angular distance between the two index lines, one on one disc and one on the other disc, then is used to calculate the velocity of the moving object. As a further simplification, I also provide a protractor having ruled thereon a number of radial lines with the corresponding velocities for different angular movement of the index lines marked so that direct reading is obtained. Obviously the protractor would be provided only when a constant speed driving source is used.

Referring to the drawings Fig. 1 is an isometric view of the device of my invention in its simplest form.

Fig. 2 is a side elevation view of the device of my invention in which correcting plates are used.

Fig. 3 is a plan view of the device shown in Fig. 2.

Fig. 4 is an end elevation view of the device shown in Fig. 2.

Fig. 5 is a diagrammatic view illustrating the way in which the device works.

Fig. 6 is a face view of one of the discs used in the device.

Fig. 7 is a fragmentary side elevation view of the device with parts shown in longitudinal vertical section to illustrate the arrangement for clamping the paper disc in place.

Fig. 8 is a face view of the protractor by which determination of the velocity measured can be quickly made.

Referring to the drawings, and particularly to Fig. 1 which illustrates a simple form of my invention, the numeral 1 designates a flat base on which suitable bearings 2 and 3 are fixedly mounted in spaced relation to journal a horizontal shaft 4 in spaced relation to the opposite ends thereof. At each end of shaft 4 is mounted means for clamping paper discs in predetermined spaced relation and fixed to the shaft to rotate therewith. As here illustrated in Fig. 7, this clamping means comprises an inner collar 5 fixed on shaft 4 and carrying an eccentrically positioned projecting pin 6. An outer collar 7 fits snugly on shaft 4 and is provided with an eccentrically positioned opening 8 therein snugly receiving pin 6. The outer ends of shaft 4 are threaded at 9 to mount a threaded nut 10 by means of which outer collar 7 may be urged toward inner collar 5. Two suitable paper discs 11 and 12 are mounted by the device, one at each end thereof, each of said discs having central opening 13 therein to pass around shaft 4 and an eccentric opening 14 through which pin 6 may extend. Each of these discs is interposed between a set of collars 5, 7 to be held in fixed parallel concentric relation on the shaft by the combined frictional clamping action of the collars and the passage of the pin 6 through opening 14. Discs 11 and 12 are provided with radial index lines 15 and 16, respectively. Adjacent each disc, a suitable pointer 40 is fixedly mounted on base 1 directly beneath shaft 4, whereby accurate registration of the index lines 15 and 16 may be obtained as the parts are assembled preparatory to use.

The device is driven by a motor 17 mounted on base 1 and whose shaft mounts a gear 18 meshing with a gear 19 fixed on shaft 4. I prefer to use a synchronous motor, where possible, to insure constant speed of operation and to permit the use of a protractor. However, where it is necessary to use a direct current motor, the same may be provided with a rheostat and tachrometer arrangement (not shown) for adjusting the speed of motor operation to a predetermined desired speed.

In using the device it is set up so that the projectile whose speed is to be measured will travel along the line A—A of Fig. 1, and the motor switched on. As soon as the discs have attained the desired rate of speed, the projectile is made to travel over the path A—A so that adjacent disc 11 is first pierced and the opposite disc 12 is pierced a very short time later. In the time that elapses between the piercing of the two discs, both of the discs will travel some distance, and it is the determination of this angle or distance of travel between the successive piercing of the discs, taken with the known rotational speed and spacing of the discs that is basis of my invention. The discs 11 and 12 are preferably formed of very thin material, such as thin paper, in order to apply minimum deflection to a projectile; it being obvious that the centrifugal force produced by high speed rotation will hold the same extended effectively even though the material is normally flexible.

Referring to the diagrammatic view Fig. 5, the two rotating discs are shown at 11 and 12 and are rotated about the axis X—X. Disc 11 has inscribed thereon index line 15 and disc 12 has corresponding index line 16 thereon, and the two discs are so positioned that the two index lines are always parallel. The object whose speed is to be measured is shown at 20 and travels along the line A—A. At the time that this object passes through disc 11 the index line 15 will be in the dotted line position in Fig. 5, as will also be the line 16 of disc 12. During the time interval that elapses while object 20 is travelling from disc 11 to disc 12, both discs will have rotated so that the index lines move to the full line positions in Fig. 5. It will be observed that this angle is the same as the angle between the hole 21 pierced in disc 11 by the projectile 20 and the hole 22 pierced in disc 12 by projectile 22. By superimposing the two discs so that their centers are in register and the holes 21 and 22 are in alignment, the angle between the index lines 15, 16 is the angle that the discs have rotated while the projectile is travelling from one disc to the other. The velocity of the projectile can then be easily determined by the following formula $$v = \frac{d \times \text{R. P. M.} \times 360}{60 \times \text{angle}}$$

$v$—representing velocity of projectile in foot/seconds.
$d$—distance between discs.
R. P. M.—revolutions per minute of discs.
angle—angle discs rotate while projectile is travelling from one to the other.

A suitable protractor 25, illustrated in Fig. 8, may be used to determine the speed of projectile 20 if desired. The protractor preferably comprises a paper disc having an index line 26 and a plurality of radially extending lines 27. The lines 27 are arranged in relation to a predetermined speed of rotation and spacing of the discs 11 and 12, and indicia adjacent said lines 27 designate the speed of object 20 when the discs of the device have rotated an amount or angle equal to the angle between that line 27 and index line 26. Where the lines 27 are quite closely spaced, it is obviously simple to use the device with reasonable accuracy by interpolation where the angle measured falls between the two lines 27 of the protractor.

The device may also be used to calculate the angle or distance between the successive piercings of the discs by aligning the pierced portion of one disc between the axis of shaft 4 and the pointer 40, and then measuring the angle between radii of the other disc extending from center of said shaft to the other pointer and from the center of the shaft to the pierced portion. In this form the single index shown may be supplanted by radii on the discs disposed in predetermined angular relation to simplify determination of the angle of displacement between the pierced portions of the discs.

In Figures 2, 3 and 4 I have shown the device provided with a sheet 30 of thin paper or similar material mounted between standards 31 on base 1 and positioned very close to each disc. These sheets of paper have lines 32 ruled thereon radiating from the axis of rotation of the discs 11 and 12, and are useful in correcting for the amount that the path traversed by the projectile 20 is out of parallel with the rotational axis of the discs. If the projectile travels at an angle to the shaft 4, the amount of this angularity and its effect on the position of the pierced holes in the two discs can easily be determined by measuring the angular difference in the location of the holes pierced in the two stationary sheets 30 and subtracting or adding this angular difference with respect to the angle between the index lines 15 and 16 which is obtained as above mentioned. It will be obvious that the difference is to be subtracted when it is in the direction of rotation of discs 11, 12, and to be added where it is counter-rotational. These sheets are also of value when a readable error might result due to the projectile being deflected slightly from its path by the first rotating disc. If such error does occur, the amount of deviation in the course of the projectile while travelling from one disc to the other will be recorded by the location of the holes pierced in the two stationary sheets 30. The angle is in this case subtracted from the angle between the index lines 15, 16 as above described. While I have shown these sheets spaced an appreciable distance away from the discs for convenience and clarity of illustration, I actually prefer to place them in light contact with the rotating discs or with very little space between.

In the case of extremely long projectiles travelling at a relatively low speed, the time required to pierce the discs may be sufficiently long to cause an elongated hole in each of the discs 11, 12. Obviously the measurements would be made from the same place in the hole in each disc usually from the point that was first pierced, as I have found this to be the most clearly defined.

While I prefer to use the rotating discs illustrated because of the simplicity of the structure employing the same, it will be obvious that other embodiments of the device, using two pierceable members spaced apart a predetermined distance and moving at a known constant speed, may be constructed without departing from the spirit of my invention.

I claim:

1. Means for measuring projectile velocity comprising a pair of soft, normally flexible imperforate thin paper sheets positioned in predetermined spaced coaxial relation, and means for rotating said sheets in unison at a predetermined constant high speed whereby said sheets are centrifugally extended to substantially rigid parallel relation to sustain each sheet against substantial deflection upon impact and piercing by a projectile.

2. Means for measuring projectile velocity comprising a frame, a pair of soft normally flexible imperforate sheets each having an index, means on said frame fixedly mounting said sheets in spaced concentric relation for rotation, indicators on said frame adjacent said sheet and in a common plane with said mounting means, and means for rotating said mounting means at predetermined constant high speed whereby said sheets are centrifugally extended to substantially rigid parallel relation to withstand piercing thereof by a projectile without substantial deflection.

3. In means for measuring projectile velocity, a rotatable shaft, a member fixed on said shaft, a projection eccentric of said member, a thin, soft, normally flexible paper sheet having spaced openings respectively fitting said shaft and projection, a member slidable on said shaft and having an eccentric recess receiving said projection, means for urging said slidable member on said shaft to clamp said sheet between said members and means for rotating said shaft at predetermined constant high speed to centrifugally extend said sheet to substantially rigid planar relation to withstand piercing by a projectile without substantial deflection.

4. Velocity measuring means comprising a pair of spaced parallel imperforate stationary sheets having parallel indexes, a pair of concentric, spaced, soft, thin, normally flexible parallel imperforate sheets, means for rotating said last named sheets at predetermined constant high speed to centrifugally extend said sheets to substantially rigid position parallel to said first sheets, each rotatable sheet being positioned for slight clearance relative to a stationary sheet, said rotatable sheets having parallel indexes in identical relation to the index of the adjacent stationary sheet.

5. Means for measuring projectile velocity comprising a frame including spaced pairs of spaced projecting arms, a pair of sheets of paper each extended between a pair of arms in parallel relation, a rotatable shaft journaled by said frame and extending perpendicular to said sheets, a pair of soft, thin, normally flexible paper discs, means for fixedly securing said discs to said shaft adjacent to said sheets to provide a slight clearance between said sheets and discs, and means for rotating said shaft at predetermined constant high speed to centrifugally extend said discs to substantially rigid relation parallel to said sheets, said sheet having parallel index lines in complementary relation to said shaft, and said discs having parallel indexes in complementary relation to said shaft, and said discs having parallel indexes in complementary relation to said sheet indexes, the arms of each pair having spaced apart a distance substantially equal to the diameter of said disc, and said sheets being positioned in identical relation to said frame.

WILLIS E. HASELWOOD.